UNITED STATES PATENT OFFICE.

GUSTAF DE LAVAL, OF STOCKHOLM, SWEDEN.

METHOD OF TESTING MILK.

SPECIFICATION forming part of Letters Patent No. 369,841, dated September 13, 1887.

Application filed June 23, 1887. Serial No. 242,303. (No specimens.) Patented in Sweden July 1, 1885, No. 413; in Belgium July 16, 1885, No. 69,605; in France July 16, 1885, No. 170,137; in England July 16, 1885, No. 8,610; in Germany July 17, 1885, No. 35,810; in Italy September 30, 1885, No. 470; in Austria-Hungary January 5, 1886, No. 26,411, and in Norway June 1, 1886, No. 114.

*To all whom it may concern:*

Be it known that I, GUSTAF DE LAVAL, a subject of the King of Sweden and Norway, and a resident of Stockholm, Sweden, have invented a new and useful Improvement in Methods for Testing Milk, (for which a Swedish patent, No. 413, July 1, 1885; a Belgian patent, No. 69,605, July 16, 1885; a French patent, No. 170,137, July 16, 1885; a British patent, No. 8,610, July 16, 1885; a German patent, No. 35,810, July 17, 1885; an Italian patent, No. 470, September 30, 1885; an Austro-Hungarian patent, No. 26,411, January 5, 1886, and a Norwegian patent No. 114, June 1, 1886, have been obtained,) of which the following is a specification.

The want of a good and simple method of testing milk, and one combining reliability and rapidity of operation, has long been felt, especially in large dairies collecting their milk from many different farms.

The methods heretofore in use for testing milk are of little real use, as they either indicate the percentage of cream of the milk, which does not stand in any fixed relation to the percentage of fat, or they are difficult to manipulate and complicated. The principal value of the milk, at least for dairies, is the butter-fat contained therein. Therefore, milk-testing methods to be of real service should indicate the amount of this fat.

The object of my improved method of testing milk is to separate directly from a certain quantity of milk the butter-fat it contains, so that the percentage of fat can be determined with great rapidity and with such accuracy that it is nearly as reliable as chemical analysis. My method is also so simple that a person unskilled can make the tests.

In carrying out my method it becomes necessary to obtain this butter-fat free from caseine, and to do this the caseine must be dissolved. As a dissolving agent I employ a mixture of acetic acid and sulphuric acid—say twenty parts of acetic acid to one part of sulphuric acid. A certain quantity of this mixture is added to a certain quantity of the milk to be tested—say equal proportions of each—and the mixture is brought to a suitable temperature by heat and poured into a Chevalier's cream-glass, and is violently agitated for a few moments, and then allowed to stand for the fatty matter to collect and rise or separate according to its specific gravity from the other materials. Instead of placing the mixture in a Chevalier's cream-glass, I may prefer to employ vessels having a fine glass tube, and to introduce such vessels into a centrifugal apparatus, and by means of the centrifugal force to drive the fat into the glass tube, where its volume can be determined, and an apparatus such as I should employ to accomplish this object is shown and described in my patent No. 365,120, granted June 21, 1887.

My improved method of testing milk is carried out in the following manner: A mixture of about twenty volumes of concentrated acetic acid and one volume of concentrated sulphuric acid is placed in an ordinary test-tube, and to this is added an equal volume of the milk to be tested. The test-tube is closed by a cork, through which a piece of glass tube is inserted, and the mixture is slightly agitated and heated on a water-bath for from five to ten minutes, after which it is agitated very vigorously, and either placed in a Chevalier's cream-glass, and set aside for the materials to separate according to their relative specific gravities, or the mixture is placed in a vessel having a fine glass tube and the fat separated by the action of a centrifugal machine, as before mentioned.

It sometimes occurs in milk diluted with water that a small white plug of caseine is visible between the fatty matter and the acid solution, but this seldom exceeds the tenth part of a millimeter in length. If the milk is not diluted with water, this plug of casiene is not visible, and no caseine is found except in minute traces.

I claim as my invention—

The method herein specified of treating milk for the separation of the butter-fat, consisting in mixing with the milk in the presence of heat, in about equal proportions, an acid composed of about one part of sulphuric acid to twenty parts of acetic acid, and then violently agitating the same and allowing the
5 materials to separate according to their relative specific gravities, substantially as specified.

In testimony whereof I have signed my name to this specification in the presence of two subscribing witnesses.

GUSTAF DE LAVAL.

Witnesses:
 TOM OÖRTENGREN,
 LOUIS RICHARD,
  *Both of Stockholm.*